United States Patent
Bailey

(10) Patent No.: US 6,441,336 B1
(45) Date of Patent: Aug. 27, 2002

(54) PROCESS AND APPARATUS FOR COLLECTING AND/OR SEPARATING IONIZED SPECIES

(75) Inventor: Geoffrey Horrocks Bailey, Preston (GB)

(73) Assignee: British Nuclear Fuels PLC, Cheshire (GB)

(*) Notice: Subject to any disclaimer, the term of this patent is extended or adjusted under 35 U.S.C. 154(b) by 0 days.

(21) Appl. No.: 09/355,469
(22) PCT Filed: Feb. 23, 1998
(86) PCT No.: PCT/GB98/00395
   § 371 (c)(1),
   (2), (4) Date: Oct. 4, 1999
(87) PCT Pub. No.: WO98/37948
   PCT Pub. Date: Sep. 3, 1998

(30) Foreign Application Priority Data

Feb. 25, 1997 (GB) .............................................. 9703866
May 22, 1997 (GB) .............................................. 9710821

(51) Int. Cl.⁷ ................................................ B23K 9/00
(52) U.S. Cl. ................................................ 219/121.59
(58) Field of Search .................................. 250/298, 287, 250/283, 282; 204/192.31, 164; 219/121.59

(56) References Cited

U.S. PATENT DOCUMENTS

| | | | | |
|---|---|---|---|---|
| 4,059,761 A | * | 11/1977 | Dawson | 250/287 |
| 4,755,671 A | * | 7/1988 | Friedland et al. | 250/281 |
| 4,757,203 A | * | 7/1988 | Gil et al. | 250/281 |
| 4,925,542 A | * | 5/1990 | Kidd | 118/723 FI |
| 6,251,281 B1 | * | 6/2001 | Ohkawa | 209/12.1 |
| 6,267,850 B1 | * | 7/2001 | Bailey et al. | 204/157.2 |
| 6,323,455 B1 | * | 11/2001 | Bailey et al. | 219/121.36 |

FOREIGN PATENT DOCUMENTS

GB  0 244 497 A  11/1987

* cited by examiner

Primary Examiner—Jack Berman
Assistant Examiner—Johnnie L Smith, II
(74) Attorney, Agent, or Firm—Workman, Nydegger & Seeley

(57) ABSTRACT

A collection method for an at least partially ionised sample is provided in which the part of the sample to be collected is discharged using an electrical conductor and the discharge part of the sample then leaves the confines of a retaining magnetic field. The discharged part of the sample and the non-discharged part are separated as a result. The collector and collection method are particularly suitable for use with ion cyclotron resonance where different parts of the sample are provided with a higher energy level to other parts.

18 Claims, 3 Drawing Sheets

PROCESS AND APPARATUS FOR COLLECTING AND/OR SEPARATING IONIZED SPECIES

BACKGROUND OF THE INVENTION

1. Field of the Invention

This invention concerns improvements in and relating to collecting and/or separating of materials, and in particular, but not exclusively, to the collecting and/or separating of ionised and/or vaporised species.

2. Present State of the Art

A number of separation techniques, such as ion cyclotron resonance, generate different energy levels in the ionised materials fed to them and make a separation based on this. In the case of ICR the energy level of one or more selected elements or isotopes can be significantly higher than for other elements or isotopes.

Prior art collection of such materials is based on the simultaneous discharge and solidification of the higher energy species, followed by a separate similar procedure applied to the lower energy species.

One such system employs an open lattice of plates presented to the process stream flow. The plates are earthed or held at a fixed electrical potential to effect discharge of the components striking them. The grid is also cold relative to the process stream and as a consequence species contacting it are solidified on the grid at the time of discharge. The grid can periodically be removed from the process stream and the solidified material removed.

The lower energy level material, due to a number of factors, largely avoids the grid. Separate discharge and condensing is effected for this part of the process stream on a subsequent collector.

Other techniques, such as various selective ionisation processes, also call for the collection of a process stream presented in an ionised, vaporised form. Similar techniques have been used to effect their collection.

The collector/separation systems of the prior art are not ideal for a number of reasons. These include the need to provide a high level of cooling into the structure and the need to remove the collecting structure from the stream periodically. Periodic collection systems render the collection of the product an essentially batchwise process restricting active processing. Furthermore, during the time between introducing a clean grid and its removal, when loaded, the operation of the collection system is also undesirably variable as the build-up of collected material effects the efficiency of the collection. Such collection grids are also not applicable for processing streams which generally result in liquid or gaseous products as such product would not be retained by the grid. The processing of water to give heavy water, for instance, does not readily provide a product suitable for collection on the grid.

Objects and Brief Summary of the Invention

The present invention aims to provide alternative collection/separation system and method of operation which addresses at least some of the problems with prior art collectors/separators.

According to a first aspect of the invention we provide a method of collecting at least part of an at least partially ionised sample contained within a retaining portion of a magnetic field, comprising the steps of:

a) discharging a part of the sample to be collected by contact with an electrical conductor;

b) the discharged part of the sample leaving the confines of the retaining portion of the magnetic field; and c) separately collecting the discharged part of the sample or converting the discharged part of the sample to a liquid or solid form.

In this way the part of the sample to be collected need not be deposited on the same element as it used to discharge it, but is instead recovered or converted to a non-vaporised state elsewhere.

The sample may be completely or substantially completely in ionised form.

The discharged part of the sample may be removed from the confines of the retaining portion of the magnetic field prior to collection or prior to conversion to liquid or solid form. This is particularly preferred where only a portion of the sample is to be collected or only some in the sample are to be collected, for instance in a separation technique.

Alternatively the discharged part of the sample may be collected or may be converted to a non-vaporised state within the confines of the retaining portion of the magnetic field, or a reduced strength magnetic field portion, and removed subsequently. This sequence may be applicable where the whole of that stream is to be so converted, following a prior separation stage for instance.

The sample may still be within a magnetic field following its leaving the retaining portion of the magnetic field. The charged species, however, are restricted to this retaining portion of the magnetic field. The retaining portion of the magnetic field may be provided at between 0.5 and 10 and preferably between 1 and 6 Tesla.

Preferably the collection method provides a separation of one part of the sample from another part of the sample. The one part may be, or include, a different element and/or different isotope and/or different compound to the other part. The one part and/or other part may consist of all of a selected element and/or isotope and/or compound in the sample. Alternatively a portion of the selected species may still be present in the other part after separation.

The separation may be of U from Pu and/or either or both from fission reaction products; of $^{235}$U from $^{238}$U; of $D_2O$ and/or HDO from $H_2O$; of $D_2$ and/or DH from $H_2$; or other such separations. The separations may be performed in discrete atomic and/or elemental and/or molecular forms, as ions.

Preferably the separation of one part of the sample from another part of the sample is based on the one part of the sample having a higher energy level than the other part. The differential energy levels are preferably provided selectively. Ion cyclotron resonance may be used to provide the differential energy levels.

Preferably the higher energy level part is discharged on contacting the electrical conductor. Preferably all, or substantially all of the one, high energy, part contacts the electrical conductor. Preferably the lower energy other part, or the substantial part thereof, avoids the electrical conductor.

The discharged portion of the sample may leave the confines of the retaining portion due to a lower pressure outside the confines of the retaining portion of the magnetic field. The pressure difference may arise due to an elevated pressure within the retaining portion of the magnetic field and/or, more preferably, a depressed pressure outside the retaining portion of the magnetic field. The depressed pressure may be generated by a vacuum pump. The pressure differential may also be used to remove the discharged part of the sample from the unit to a remote location, for instance entirely out of the magnetic field.

A conversion from uncharged vapour to liquefied or solidified form may be provided and may be effected by contacting the discharged portion of the material with a reduced temperature component. The component temperature being such as to reduce the material below its liquification or solidification point for the conditions at that location. A contact surface may be employed. A liquefied product and/or solidified product may be generated.

Removal means may be provided to remove the liquefied or solidified material from the unit to a product stream.

The discharged portion of the sample may be retained as a vapour or gas form as the separated part of the sample.

Solidified products may include uranium dioxides. Liquid product forms may include $D_2O$. Gaseous product forms may include $D_2$.

The undischarged part of the sample may be discharged and/or converted to a non-vaporised state at a further location. Single stage discharge and conversion to product form, such as a non-vaporisation state is preferred. The discharge may be affected by contacting the undischarged part of the sample with a conductor. The conductor may be provided at an applied potential or earthed potential. Contacted with a cooled surface may be employed. A gaseous and/or liquid and/or solid product may be produced.

According to a second aspect of the invention we provide collecting apparatus comprising a magnetic field configured to retain an ionised part of an at least partially ionised sample within a retaining portion of the magnetic field; an electrical conductor provided within the retaining portion of the magnetic field and with which at least a part of the sample is contacted and discharged; and separate means for collecting the discharged part of the sample or for converting the discharged part of the sample from a discharged vapour into a solid and/or a liquid form.

The electrical conductor may comprise a grid. The electrical conductor may be earthed or a potential, most preferably fixed, may be applied. Preferably the grid is formed of a series of plates, most preferably parallel plates. The grid may be provided substantially perpendicularly aligned to the process stream flow direction. Preferably the grid is dimensioned to coincide with the orbital diameter of the high energy part of the sample, but so as to avoid the orbital diameter of the low energy part of the sample.

Preferably the grid is heated. This ensures only discharge of the contacting particles occurs. The grid may be operated at temperatures in excess of the boiling or sublimation point of the material to be discharged under the operating pressure. The grid may be present in a pressure of between 0.01 and 2 Pa in operation. Heating of the grid may be provided by electrical means.

The discharged part of the sample may be collected and/or may be converted to a solid and/or liquid form within the retaining portion of the magnetic field prior to removal, but is preferably collected and/or converted to a solid and/or liquid form outside the retaining portion of the magnetic field. In either event the sample may still be within a magnetic field and/or within the apparatus.

The means for converting the discharged part of the sample may comprise a reduced temperature component. A component such as a surface with which the part of the sample is brought into contact may be used. The surface may be a wall of the apparatus and/or a separate component. Preferably the component is an electrical conductor.

The component may comprise a fluid with which the sample is contacted. The fluid may be a gas, such as an inert gas; and/or a liquid. The liquid may comprise previously collected portions of the component.

Removal means may be provided to promote removal of the material to a product stream. The removal means may comprise one or more scraper blades. The blades may be rotated or reciprocated or otherwise moved over a surface of the unit walls and/or a remote location form the unit. A rotating helical scraper is preferred, most preferably on a cylindrical wall of the apparatus. The removal means are preferably provided outside the retaining portion of the magnetic field. The non-vaporised product is preferably separated from the cooling component is give a product stream.

Where an undischarged part of the sample remains this may be discharged and/or converted to a non-vaporised form by further collection means. The further collection means may be of an equivalent type to the first. The further collection means may effect both conversions in a single stage. A rotating cooled drum may be employed. The drum may be cooled by liquid nitrogen, particularly for volatile species. A scraper may be provided to remove solidified material from the drum.

Preferably means are provided to remove the discharged part of the sample from the magnetic field prior to collection and/or prior to conversion to non-vaporised form. The means may comprise a pressure differential, due to an elevated pressure within the magnetic field, a depressed pressure outside the magnetic field or a combination of both. The means may comprise a vacuum pump.

The collection apparatus may provide separation apparatus to provide a separation of part of the sample from another part. The separation may be based on part of the sample having a higher energy level than the other part of the sample. The apparatus may include selective energising means for part of the sample. The selective energising means may be an ion cyclotron resonance unit.

According to a third aspect of the invention we provide a product and/or further processed product obtained from the method of the first aspect of the invention and/or the apparatus of the second aspect of the invention.

The product may be an $^{235}U$ enriched material; $^{239}Pu$ and/or $^{241}Pu$ enriched material; HDO and/or $D_2O$ enriched material; HD and/or $D_2$ enriched material; odd numbered Gd isotopes; fission reaction products. The further processed products may include nuclear fuel, fuel pellets, loaded fuel rods, neutron poisons; heavy water.

BRIEF DESCRIPTION OF THE DRAWINGS

Various embodiments of the invention will now be described, by way of example only, and with reference to the accompanying drawings, in which.

DETAILED DESCRIPTION OF THE PREFERRED EMBODIMENT

Figure 1:
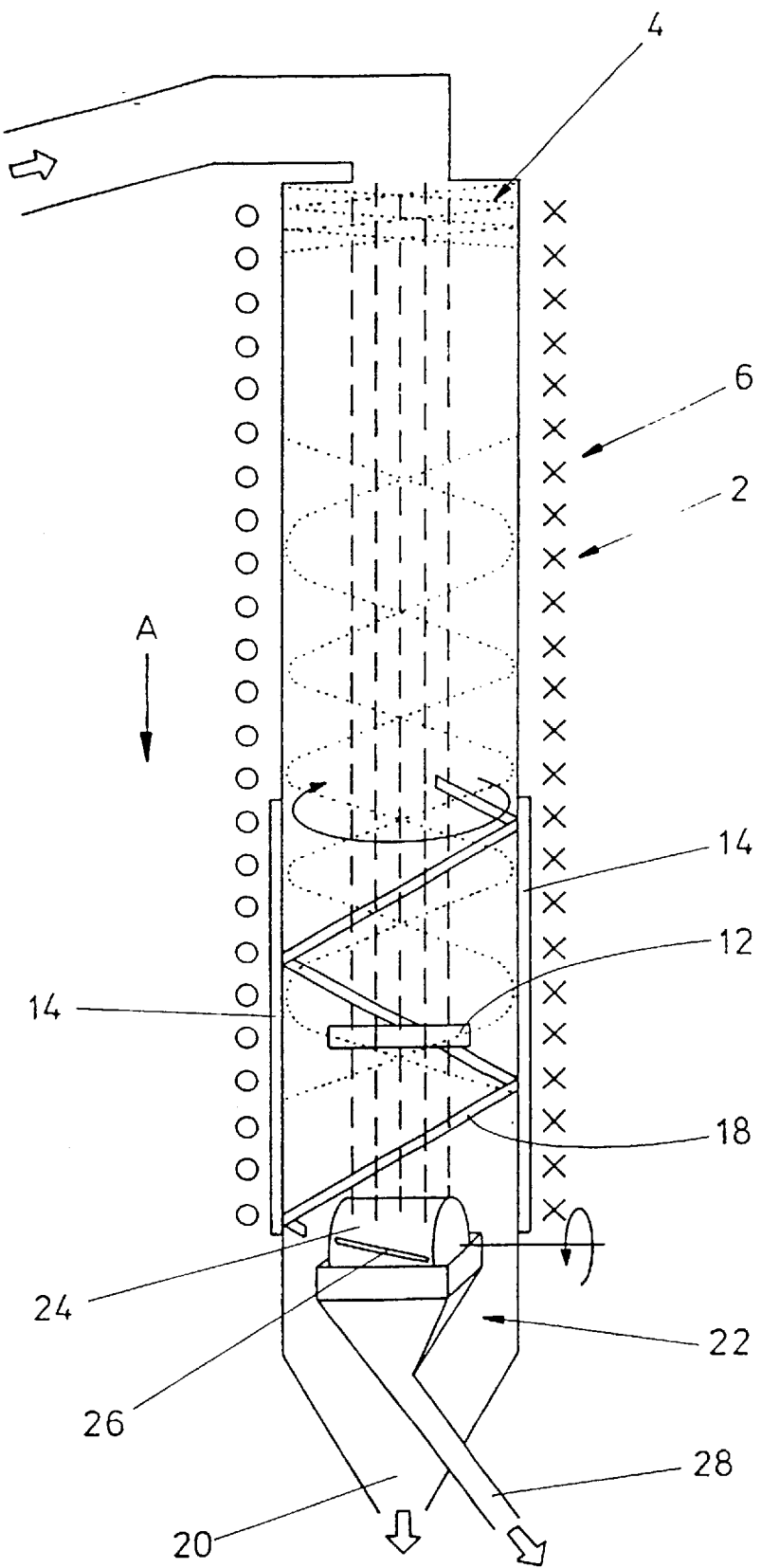
FIG. 1 illustrates a first embodiment of the invention.

In a first embodiment a feed material consisting of mixed isotopes of uranium, $^{238}U$ and $^{235}U$, is fed to a magnetic field 2 and is subsequently ionised at ionising stage 4 by an electron cyclotron resonance unit. The ionised feed is then fed to an ion cyclotron resonance unit 6 which is tuned to preferentially excite the minor species present, $^{235}U$.

The ion cyclotron resonance unit 6 generates $^{235}U$ ions with a substantially higher energy level than the $^{238}U$ ions present as a result. Due to the containing magnetic field 2 the ions progress down the unit according to a generally spiral path. The higher energy material spirals with a larger radius than the lower energy material. The collection apparatus provided in the lower portion of the unit consists of separate collection means for the higher and lower energy species.

The collector for the higher energy species consists of an impactor grid 12. The impactor grid 12 consists of a series of plates with their thin edges presented to the flow direction, arrow A.

The openings between the plates are such as to conflict with the majority of the $^{235}U$ ions but of a sufficient size to allow the vast majority of the less excited $^{238}U$ ions through.

The impactor grid (12) is earthed or provided with a fixed potential so as to discharge the charge carried by the $^{235}U$ ions contacting it. The impactor grid 12 is still within the containing magnetic field 2.

Contrary to prior art systems, however, the impactor grid does not act as the collection point for the higher energy species. Instead the impactor grid is held at a relatively hot temperature, greater than 2200K with the overall result that whilst the molecules are electrically discharged they remain as a vapour.

The net result of the process stream reaching the impactor grid 12 is that the majority of the $^{235}U$ is uncharged but in vapour form and the vast majority of the $^{238}U$ remains in charged vapour form.

As uncharged species the $^{235}U$ is no longer contained by the magnetic field. The $^{235}U$ is free to contact the walls 14 of the unit from which the still charged particles are isolated by the magnetic field 2. In an alternative form a separate assembly, not shown, can be provided between the contained process stream and the unit walls. Maintaining these components, or the walls (14) cooled converts the $^{235}U$ contacting it from a vapour to liquid or solid state.

As illustrated in this embodiment the device is provided with a rotating helical scraper 18 which scrapes over the surface of the walls of the unit, or at a slight separation therefrom, and which promotes the passage of solidified $^{235}U$ towards a product hopper 20. The scraper 18 may scrape the surface clean of the condensed product or may leave a layer of the condensed product in-situ.

The still charged vapour form $^{238}U$ continues on to a collecting apparatus of its own 22. This apparatus consists of a cooled rotating drum 24 on to which the process stream impacts. The earthing of this drum provides discharge for the ions and the cooling effects a solidification of the product. Rotation of the drum causes the solidified material to be scraped off by blade 26. The $^{238}U$ solidified uncharged product leaves the unit via product stream 28.

The apparatus and method are equally suitable for separating components in molecular form. For instance, uranium isotopes may be separated from one another in one or more of the oxide forms, i.e. 235UO2 can be separated form 238UO2.

Figure 2:
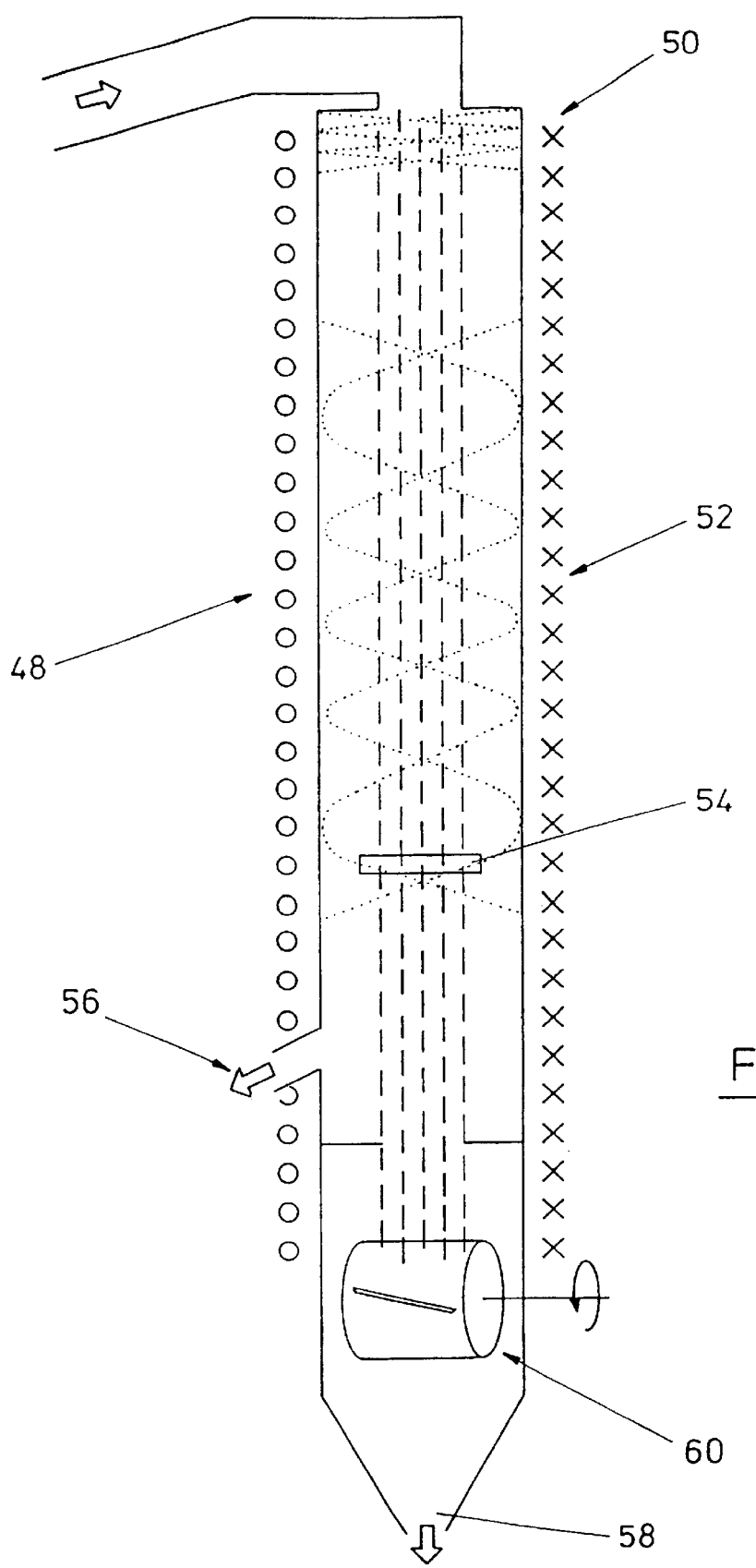
FIG. 2 illustrates a second embodiment of the invention.

FIG. 2 illustrates a further embodiment of the invention based around a similar concept for the production of preferentially excited species. In this case, however, the feed consists of water. The water may conveniently be converted to steam and then fed to the magnetic field 48 before conversion by the ionising unit 50. Conditions in the ionising unit are controlled to give molecular ions.

Preferential excitement of $D_2O$ and/or HDO occurs relative to the $H_2O$ in the ion cyclotron resonance unit.

On reaching the collection apparatus the impactor grid 54 functions in a similar manner. The charge on the higher energy ions is discharged but the temperature of the grid is sufficient to maintain the species in vapour form. The lower energy $H_2O$ passes on unaltered by the grid 5, still ionised and still in vapour form.

Unrestrained by the magnetic field the uncharged $D_2O$ and HDO are free to be drawn off by vacuum pump to a condensing location 56. A number of draw off points may be provided below the impactor grid 54. A enriched product stream is thus formed.

The $H_2O$ is impacted, discharged and condensed as outlined above for the first embodiment, for instance on a liquid nitrogen cooled drum.

The product stream 56 is enriched in HDO and $D_2O$ and finds a number of uses, including in CANDU reactors.

Figure 3:
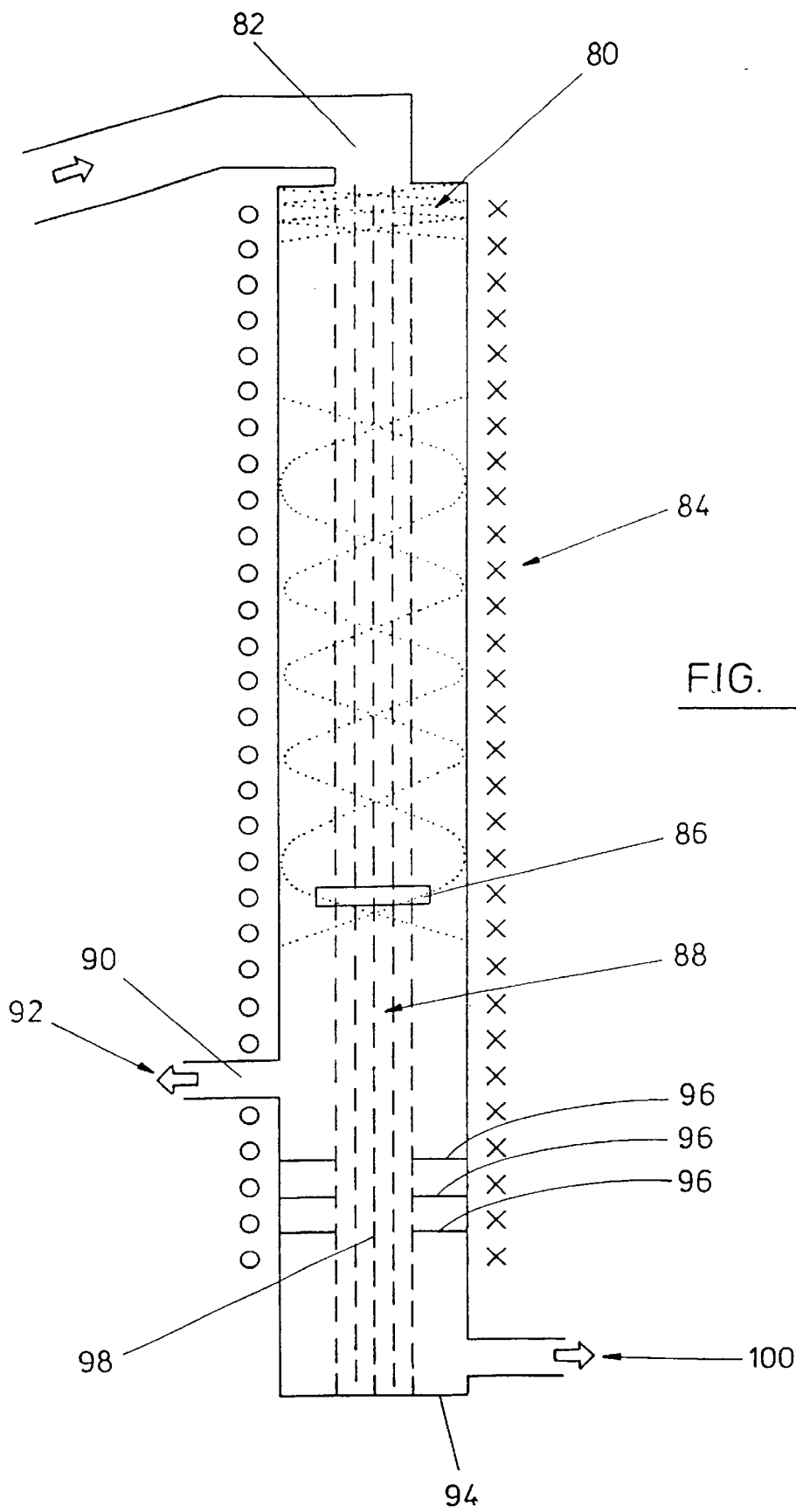
FIG. 3 illustrates a third embodiment of the invention.

The third embodiment of the invention illustrated in FIG. 3, uses a feed stream including hydrogen and deuterium molecules. The mixed hydrogen and deuterium may be obtained from an earlier concentrating process which has increased the deuterium levels in the feed, or may comprise a natural grade feed. The molecular forms entering the apparatus, $H_2$, $D_2$ and HD are first fed to an electron cyclotron resonance unit 80 which converts the feed into at least partially ionised form. The ions are contained within a magnetic field and flow away from the inlet 82. It is preferred that substantially all of the feed is ionised. The feed may be converted to a number of ionised forms, including $H^+$, $D^+(H_1^+)$, $(HD_2)^+$, $(D_2H)^+$ and $D_2^+$.

The ions are then subjected to an ion cyclotron resonance stage 84 during which they are excited by the input of further energy.

The excited molecules pass along the magnetic field and reach the impactor grid 86 positioned across the process flow stream. Due to their higher energy the deuterium containing ions, or depending on the level of excitation the ions solely containing deuterium, impact on the grid structure. The less excited ions pass through the grid and are still in ionised form in zone 88.

Having impacted on the electrically conductive grid 86 the higher energy species are discharged. However, the conditions are such that the discharged ions remain in gaseous form and also pass into zone 88.

The energy level following discharge would be such as to present the deuterium ions in molecular form, ie $D_2$.

By applying a pressure differential compared with outlet 90 and zone 88 the uncharged ions are drawn from the inside of the apparatus and form product stream 92 enriched in deuterium.

Within zone 88 the still charged ions are contained within the magnetic field and as a consequence pass further on through the apparatus to discharge plate 94. This discharge plate results in electrical discharge of the ions and is cooled to provide the discharged product as molecular hydrogen. A series of baffles 96 are provided to deter discharged hydrogen passing back up the apparatus and into zone 88. The aperture 98 in the baffle is wholly within the cross section of the magnetic field.

The discharged product forms product stream 100 which is withdrawn from the apparatus due to a pressure differential.

The deuterium enriched stream 92 and the deuterium depleted/hydrogen rich stream 100 may be separately passed to other similar units for further processing. In this way remaining deuterium in the product stream 100 can be removed and isolated and similarly any hydrogen present in the deuterium enriched stream 92 can be removed to give further enrichment.

The features and options illustrated in the three embodiments are equally applicable to the processing of other feed materials and for the collection of other processes producing ionised or part ionised process streams.

What is claimed is:

1. A method of collecting at least part of an at least partially ionised sample contained within a retaining portion of a magnetic field, comprising the steps of:
    a) discharging a part of the sample to be collected by contact with an electrical conductor within the retaining portion of the magnetic field;
    b) the discharged part of the sample leaving the confines of the retaining portion of the magnetic field; and
    c) separately collecting the discharged part of the sample or converting the discharged part of the sample to a liquid or solid form.

2. A method according to claim 1 in which the discharged part of the sample is removed from the confines of the retaining portion of the magnetic field prior to collection.

3. A method according to claim 1 in which the discharged part of the sample is collected within the confines of the retaining portion of the magnetic field and removed subsequently.

4. A method according to claim 1 in which the collection method provides a separation of one part of the sample from another part of the sample, the one part being, or containing, a different element to the other part.

5. A method according to claim 1 in which a separation of one part of the sample from another part of the sample is based on the one part of the sample having a higher energy level than the other part.

6. A method according to claim 5 in which the different energy levels are imparted by ion cyclotron resonance.

7. A method according to claim 1 in which the discharged portion of the sample may leave the confines of the retaining portion due to a lower pressure outside the confines of the retaining portion of the magnetic field.

8. A method according to claim 1 in which the conversion of the discharged part of the sample to liquefied or solidified form is effected by contacting the discharged portion of the material with a reduced temperature component, below its liquification and/or solidification point for the conditions at that location.

9. Collecting apparatus comprising a magnetic field configured to contain an ionised part of an at least partially ionised sample within a retaining portion of the magnetic field; an electrical conductor provided within the retaining portion of the magnetic field and with which at least a part of the sample is contacted and discharged; and separate means for converting the discharged part of the sample from a discharged vapour into a solid and/or a liquid form and/or collecting the discharged part of the sample.

10. Apparatus according to claim 9 in which the electrical conductor is earthed.

11. Apparatus according to claim 9 in which the electrical conductor is a grid and the grid is heated to temperatures in excess of the boiling [or sublimation] point of the material to be discharged under the operating pressure.

12. Apparatus according to claim 9 in which the discharged part of the sample is converted to solid and/or liquid form by contact with a cooling means below its liquification and/or solidification temperature.

13. A method according to claim 1 in which the discharged part of the sample is removed from the confines of the retaining portion of the magnetic field prior to conversion to liquid and/or solid form.

14. A method according to claim 1 in which the discharged part of the sample is converted to a non-vaporised state within the confines of the retaining portion of the magnetic field and removed subsequently.

15. A method according to claim 1 in which the collection method provides a separation of one part of the sample from another part of the sample, the one part being, or containing, a different isotope to the other part.

16. A method according to claim 1 in which the collection method provides a separation of one part of the sample from another part of the sample, the one part being, or containing, a different compound to the other part.

17. Apparatus according to claim 9 in which the electrical conductor is at a fixed potential.

18. Apparatus according to claim 9 in which the electrical conductor is a grid and the grid is heated to temperatures in excess of the sublimation point of the material to be discharged under the operating pressure.

* * * * *

UNITED STATES PATENT AND TRADEMARK OFFICE
CERTIFICATE OF CORRECTION

PATENT NO. : 6,441,336 B1
DATED : August 27, 2002
INVENTOR(S) : Geoffrey Horrocks Bailey It is certified that error appears in the above-identified patent and that said Letters Patent is hereby corrected as shown below:

Column 5,
Line 2, start a new paragraph with "The"

Column 6,
Line 27, change "$D^+(H_1^+)$" should read -- $D^+(H_3^+)$ --
Line 27, change "$D_2^+$" should read -- $D_3^+$ --

Column 8,
Line 14, delete "[or sublimation]"

Signed and Sealed this

Eighth Day of April, 2003

JAMES E. ROGAN
*Director of the United States Patent and Trademark Office*